United States Patent [19]

Ogura

[11] Patent Number: 5,726,712
[45] Date of Patent: Mar. 10, 1998

[54] REDUCED BIT NUMBER MOTION VECTOR DETECTION

[75] Inventor: Eiji Ogura, Saitama, Japan

[73] Assignee: Sony Corporation, Tokyo, Japan

[21] Appl. No.: 374,816

[22] Filed: Jan. 19, 1995

[30] Foreign Application Priority Data

Jan. 21, 1994 [JP] Japan .................................. 6-022223

[51] Int. Cl.$^6$ ...................................................... H04N 7/32
[52] U.S. Cl. ........................... 348/402; 348/416; 348/699
[58] Field of Search .......................... 348/384, 390, 348/400–405, 407, 409–413, 415, 416, 420, 421, 699; 382/232, 236, 238, 248–251, 278; H04N 7/137

[56] References Cited

U.S. PATENT DOCUMENTS

| | | | |
|---|---|---|---|
| 4,689,671 | 8/1987 | Ohki . | |
| 4,779,131 | 10/1988 | Matsumoto et al. | 348/699 |
| 5,046,179 | 9/1991 | Uomori et al. | 382/278 |
| 5,049,990 | 9/1991 | Kondo et al. | 348/421 |
| 5,111,511 | 5/1992 | Ishi et al. | 348/699 |
| 5,173,770 | 12/1992 | Kondo et al. | 348/699 |
| 5,198,901 | 3/1993 | Lynch | 348/413 |
| 5,253,052 | 10/1993 | Hanashiro et al. | 348/416 |
| 5,398,079 | 3/1995 | Liu et al. | 348/699 |
| 5,515,114 | 5/1996 | Murata | 348/420 |
| 5,528,313 | 6/1996 | Tanaka et al. | 348/699 |

FOREIGN PATENT DOCUMENTS

| | | |
|---|---|---|
| A-0387849 | 9/1990 | European Pat. Off. . |
| A-0508476 | 10/1992 | European Pat. Off. . |
| A-3719023 | 12/1988 | Germany . |
| A-3839502 | 5/1990 | Germany . |

OTHER PUBLICATIONS

Journal of VLSI Signal Processing 5 (1993) Apr., pp. 125–136, Reventlow, "System Considerations and the System Level Design of a Chip Set for Real–time TV and HDTV Motion Estimation".

*Primary Examiner*—Richard Lee
*Attorney, Agent, or Firm*—William S. Frommer; Alvin Sinderbrand

[57] ABSTRACT

In image compression using motion compensated predictive coding, the number of bits of pixel data is reduced before the pixel data are supplied to a motion vector detecting apparatus. Motion vectors are detected using a pipelined operation in which pixel by pixel differences between a reference block and a search block are obtained and summed. At each stage of the pipeline, the sum of differences is limited to a predetermined maximum number of bits.

23 Claims, 6 Drawing Sheets

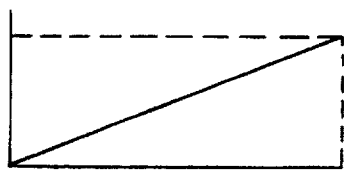
FIG.4A
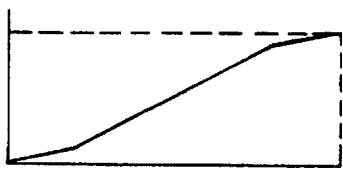
FIG.4B
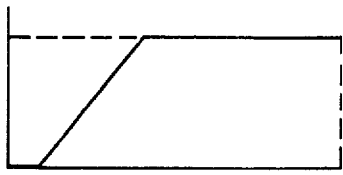
FIG.4C
FIG.4D
FIG.4E
FIG.5A
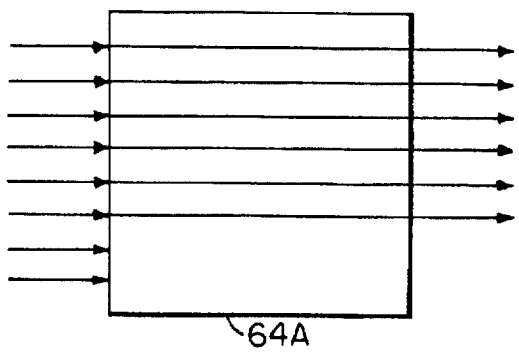
FIG.5B
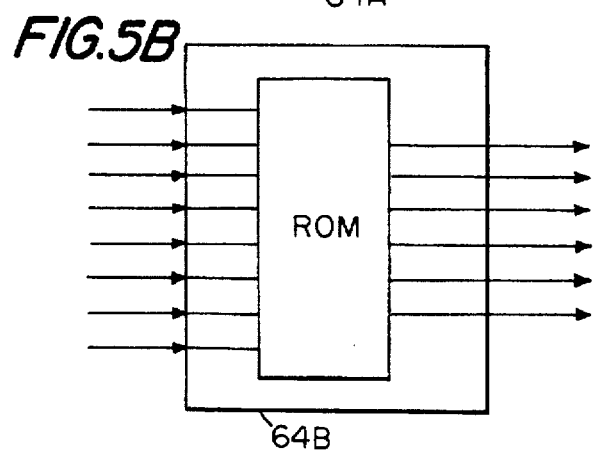
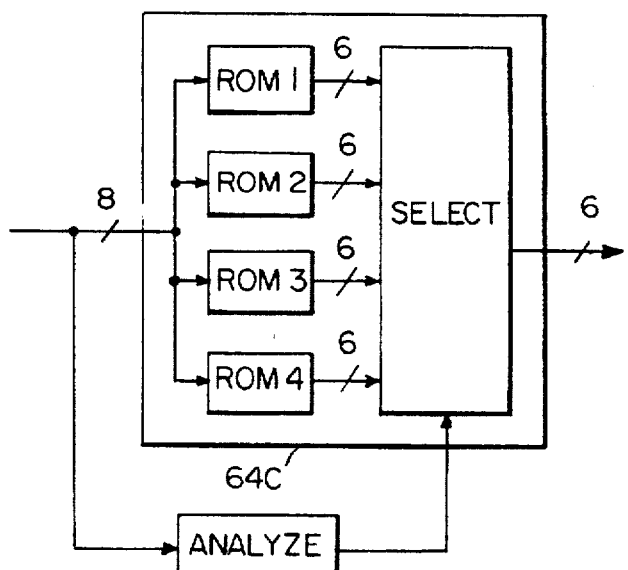
FIG.5C

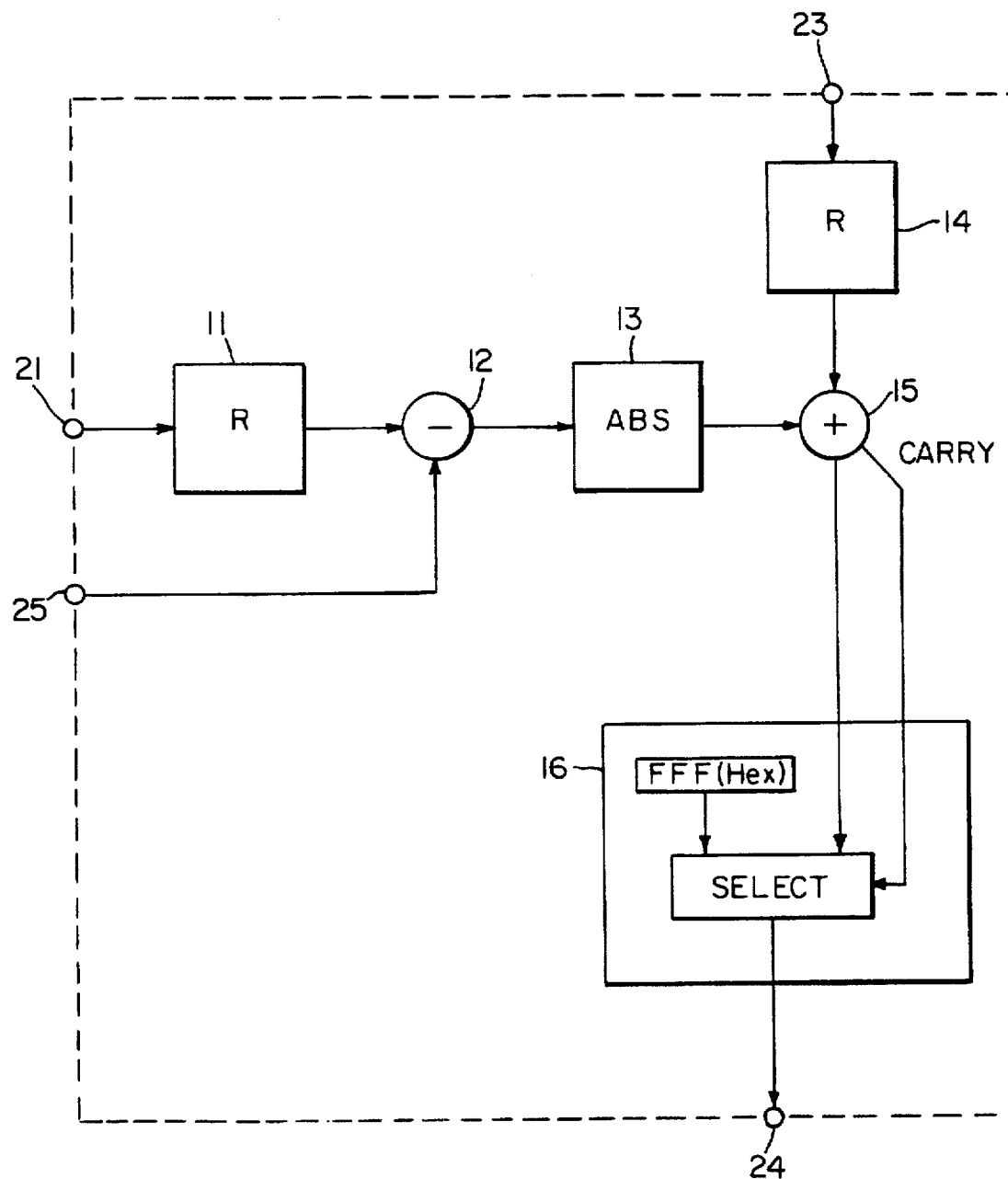

REDUCED BIT NUMBER MOTION VECTOR DETECTION

BACKGROUND OF THE INVENTION

The present invention relates to a motion vector detecting apparatus suitable for use in predictive coding of images, and, more particularly, is directed to an apparatus which processes a reduced number of bits.

A conventional technique for image compression is predictive coding, in which blocks of a reference frame are motion compensated to produce a prediction of a present frame. The differences between blocks of the predicted present frame and blocks of the actual present frame are used as compressed data, and these differences may be further compressed by an orthogonal transformation such as a discrete cosine transformation (DCT), quantization and variable length coding.

FIG. 1 is a diagram illustrating a block matching method useful for motion compensation in predictive coding. Reference frame 101 contains reference block 103. Search frame 102 contains candidate search block 104 which is moved through search range 105.

FIG. 2A shows the pixels of reference block 103, which are conveniently referred to as pixels A1, A2, A3, . . . . FIG. 2B shows the pixels of the search range 105, which are conveniently referred to as pixels B1, B2, B3, . . ., with the search block 104 positioned in the upper left corner of the search range.

During a block matching operation, the search block 104 is moved through the search range 105, typically on a pixel by pixel basis, while the absolute values of the differences between the pixels of the reference and search blocks are obtained and summed for each position of the search block. The minimum sum indicates the best matching position of the search block. A motion vector is generated between the reference block and the best matching position of the search block.

During predictive coding, the reference block of the locally stored reference frame is moved in accordance with the motion vector to produce a predicted block, thereby compensating for motion between the reference and search frames.

A problem arises when the compressed data stream is locally decoded to produce the locally stored reference frame. Specifically, noise may be introduced by the quantization portion of compressing the image, and additional noise may be introduced by inverse quantization which is part of the local decoding. Due to such noise, an erroneous motion vector may be produced. For example, even if there is no motion between successive frames, the conventional motion vector detecting apparatus may detect motion due to the noise introduced by quantization and dequantization. Of course, this erroneous motion vector detection problem may also occur if the original image includes noise.

A motion vector detecting apparatus has been proposed in which pixel by pixel differences between the reference block and the search block are obtained and summed in a pipelined operation, that is, the first difference is added to the second difference to produce a first result which is added to a third difference to produce a second result which is added to a fourth difference to produce a third result and so forth. This proposed apparatus operates quickly.

However, when the sum of the differences is obtained through pipelined operations, the number of bits needed to represent the partially summed result becomes very large, which in turn increases the required circuit scale. For example, when a block comprises 16 pixels×16 lines, there are 256 pixels in the block. When each pixel is represented by 8 bits, the sum of differences between the 256 pixels of the reference block and the 256 pixels of the search block may require 16 bits for proper representation.

OBJECTS AND SUMMARY OF THE INVENTION

Therefore, an object of the present invention is to provide a motion vector detecting apparatus which avoids the aforementioned disadvantages of the prior art.

It is another object of the present invention to reduce the occurrence of erroneous motion vector detection.

It is yet another object of the present invention to reduce the circuit scale required for a motion vector detecting apparatus.

It is a further object of the present invention to eliminate the large number of bits required when the sum of differences between reference block pixels and search block pixels is obtained in a pipelined operation.

In accordance with an aspect of this invention, the foregoing objects are met by an apparatus and a method for motion vector detection which receives reference pixel data and search pixel data each having a first number of bits that are reduced to a second number of bits which is less than said first number of bits. A motion vector is detected between the bit number reduced reference pixel data and the bit number reduced search pixel data.

In accordance with another aspect of this invention, the foregoing objects are met by an apparatus and a method for motion vector detection which receives reference pixel data and search pixel data each having a first number of bits, subtracts the search pixel data from the reference pixel data to produce difference data, and obtains an absolute value of the difference data. Partial sum of difference data is received and added to the difference data to produce further sum of difference data, which is limited to a second number of bits which is greater than the first number of bits.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIGS. 4A–4E are charts illustrating different bit number conversion characteristics which may be used in the present invention;

FIGS. 5A–5C are block diagrams illustrating different bit number conversion circuits which may be used in the present invention;

FIG. 7 is a block diagram of an operation unit of the circuit shown in FIG. 6.

DETAILED DESCRIPTION OF THE PREFERRED EMBODIMENTS

The present invention reduces the number of bits of pixel data before the pixel data are supplied to a motion vector detecting apparatus. Generally, the least significant bits of pixel data are eliminated, which serves to substantially eliminate noise from the pixel data supplied to the motion vector detecting apparatus. Consequently, the frequency of occurrence of erroneous detection of motion vectors due to noise is reduced and the circuit scale of the motion vector detecting apparatus can also be reduced.

The present invention detects motion vectors using a pipelined operation in which pixel by pixel differences between a reference block and a search block are obtained and summed. However, at each stage of the pipeline, the sum of differences is limited to a predetermined maximum number of bits, which reduces the circuit scale of the motion vector detecting apparatus.

Figure 3:
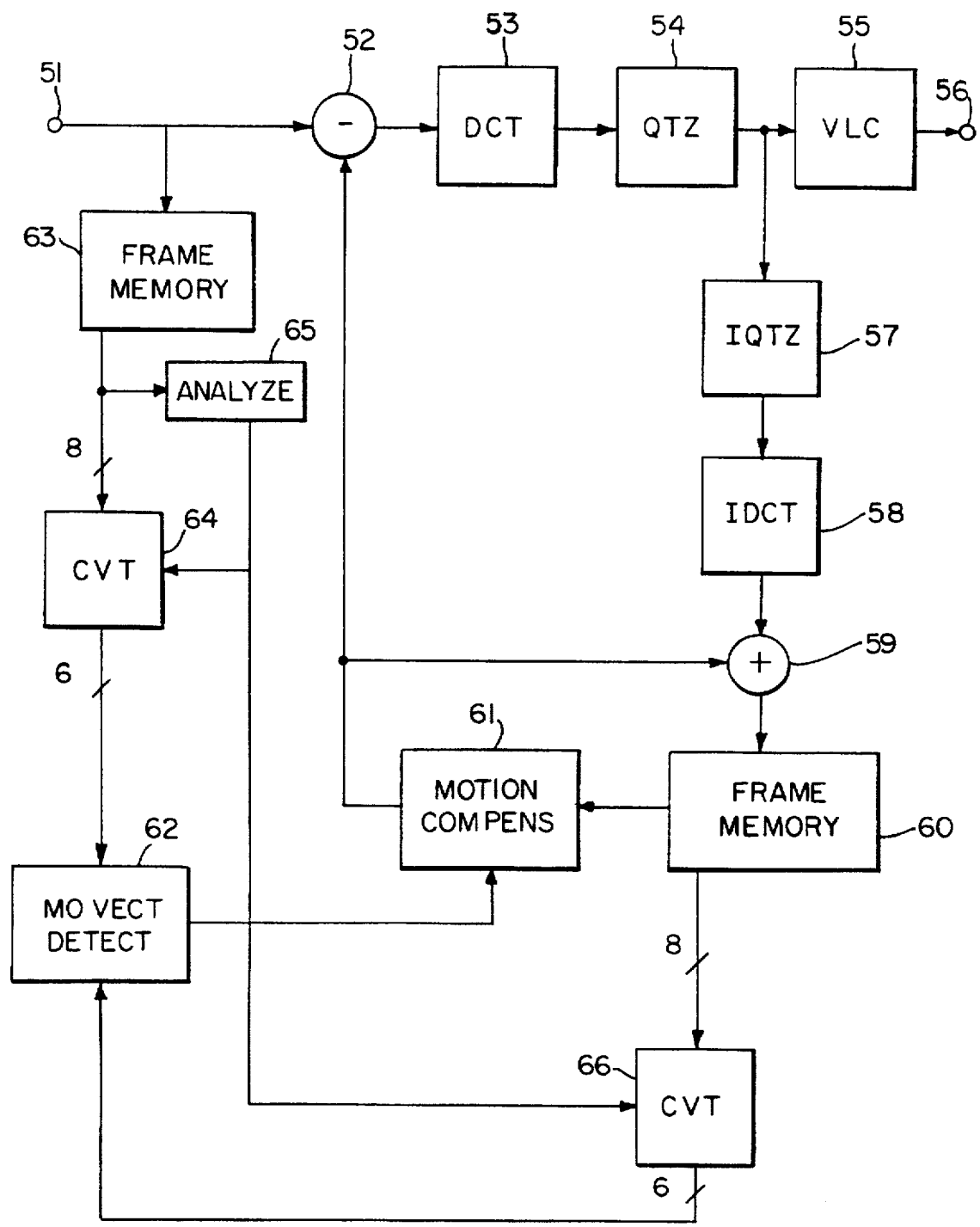
FIG. 3 is a block diagram of an image compression apparatus using interframe predictive coding according to the present invention.

Referring now to the drawings, and in particular to FIG. 3, there is illustrated an image compression apparatus using interframe predictive coding according to the present invention.

A digital video signal representing pixels of a present frame is applied, pixel by pixel, to an input terminal 51. Each pixel is represented by, for example, eight bits. The input terminal 51 supplies the pixels of the present frame to a subtracting circuit 52 and to a frame memory 63.

The subtracting circuit 52 also receives a signal representing motion compensated reference frame pixels, and is adapted to subtract, on a pixel by pixel basis, the motion compensated reference frame pixels from the present frame pixels to produce a pixel difference signal, and to apply the pixel difference signal to a DCT circuit 53.

The DCT circuit 53 is operative to transform the pixel difference signal into coefficient data and to supply the coefficient data to a quantization circuit 54, which functions to quantize the coefficient data and to supply the quantized data to a variable length coding circuit 55 and to an inverse quantizing circuit 57. The coding circuit 55 is adapted to encode the quantized data using a variable length code such as a Huffman code to produce compressed image data, and to supply a compressed image data signal to an output terminal 56.

The inverse quantizing circuit 57, inverse DCT circuit 58, adder 59, frame memory 60 and motion compensation circuit 61 form a local decoding loop. The inverse quantizing circuit 57 is operative to dequantize the quantized data to produce recovered coefficient data and to supply the recovered coefficient data to the inverse DCT circuit 58 which is adapted to inverse transform the recovered coefficient data to produce recovered difference data.

Adder 59 receives a recovered difference data signal from inverse DCT circuit 58 and the motion compensated reference frame pixel signal, and functions to add these signals to produce locally decoded present frame pixel data that is applied to frame memory 60, to be used as reference frame data for the next present frame supplied to the input terminal 51.

In accordance with the present invention, the pixels of the present and reference frames stored in the frame memories 63, 60, respectively, are converted from eight bit data to six bit data by converting circuits 64, 66, respectively, as explained in detail below, and supplied to motion vector detecting circuit 62.

Figure 1:
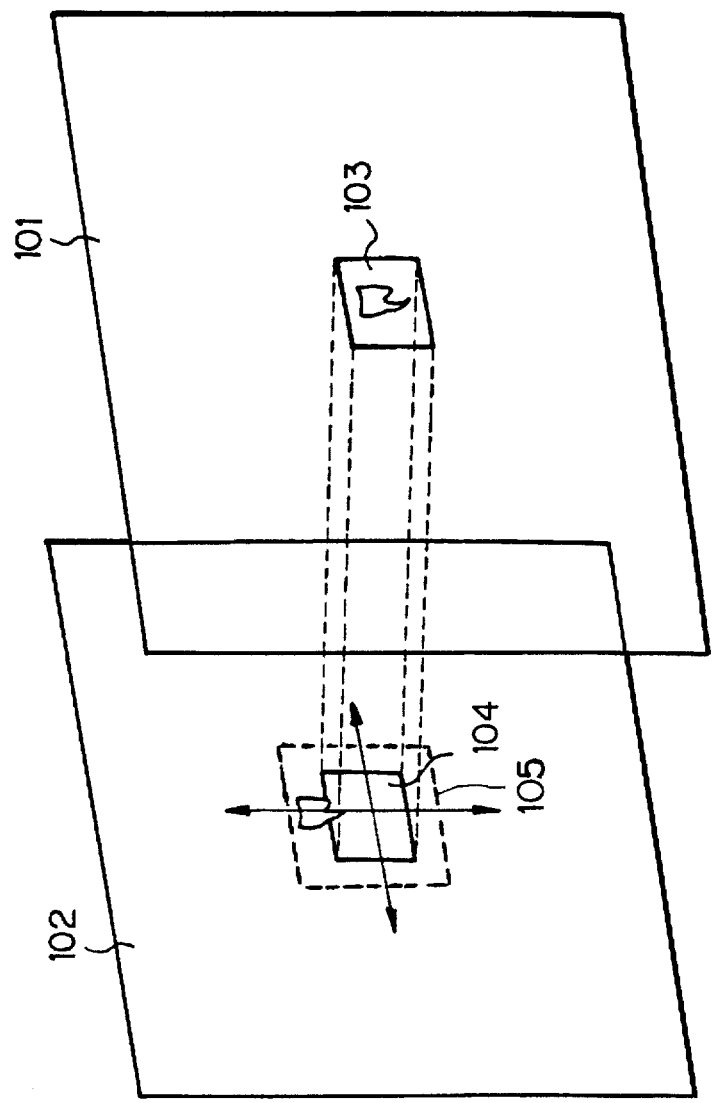
FIGS. 1, 2A and 2B are diagrams referred to in explaining motion vector detection.

The motion vector detecting circuit 62 obtains a motion vector between a block of the reference frame and a block of the present frame using the block matching method described above with reference to FIGS. 1, 2A and 2B. An embodiment of a motion vector detecting circuit 62 according to the present invention is described below. The motion vector detecting circuit 62 supplies the motion vector to the motion compensating circuit 61.

The motion compensating circuit 61 applies the motion vector for each block to the reference frame pixels to produce the motion compensated reference frame pixel data, and supplies this data to subtractor 52 and adder 59.

Distortions caused by the quantization and the inverse quantization are included in the data stored in the frame memory 60. Consequently, the lower bits in the frame memory 60 typically represent noise. Motion detection based on such noisy data is of low reliability, that is, tends to produce erroneous motion vectors.

According to the present invention, the data stored in the frame memory 60 are converted to data having a smaller number of bits such that at least one of the least significant bits of each pixel, which mainly represent noise, are eliminated. This improves the reliability of the motion vector detection process by reducing the influence of noise, and also permits reduction in the circuit scale.

FIGS. 4A–4E are charts illustrating different bit number conversion characteristics which may be used in the present invention, and FIGS. 5A–5C are block diagrams illustrating different bit number conversion circuits which may be used in the present invention.

FIG. 4A shows the case of simply dropping the least significant bits representing a pixel, which results in a linear bit number conversion characteristic. For example, if the output of the frame memory 63 or 60 comprises eight bit data, and the conversion circuit 64 or 66 converts the eight bit data to six bit data, then the x-axis in FIG. 4A represents pixels having amplitude values (magnitudes) between 0 and $2^8-1=255$, while the y-axis in FIG. 4A represents bit number converted pixels having amplitude values between 0 and $2^6-1=63$.

FIG. 5A shows a converting circuit 64A (or 66A) which implements the linear conversion characteristic shown in FIG. 4A. The circuit shown in FIG. 5A simply drops the two least significant bits of the input data applied thereto.

The linear conversion characteristic of FIG. 4A does not optimally allocate bits with respect to human visual perception.

FIG. 4B shows a non-linear bit number conversion characteristic which reduces the perceived degradation in picture quality relative to the linear characteristic of FIG. 4A. In FIG. 4B, more degradation is acceptable at the extremes of pixel values, that is, low brightness and high brightness pixels, as such degradation is not readily perceptible. Advantageously, less degradation occurs in pixels of medium brightness.

FIG. 5B shows a converting circuit 64B (or 66B) which implements the non-linear bit number conversion characteristic shown in FIG. 4B. The eight bits of pixel data are applied to a read only memory (ROM), and used as address data for a look-up table stored in the ROM. The look-up table represents the non-linear bit number conversion characteristic shown in FIG. 4B. The corresponding six bit value is read out of the ROM as bit number converted pixel data.

Other bit number conversion characteristics are more suitable when the distribution of the pixel amplitudes are clustered. FIGS. 4C, 4D and 4E show conversion characteristics appropriate when the pixels in a block represent only a low brightness image area, a medium brightness image area and a high brightness image area, respectively.

FIG. 5C shows a converting circuit 64C (or 66C) which adaptively selects a bit number conversion characteristic as a function of the pixel amplitudes in a block for which a motion vector is being detected. Eight bit data is applied to four read only memories ROM1 . . . ROM4, containing look-up tables representing the non-linear bit number conversion characteristics shown in FIGS. 4B–4E, respectively.

The eight bit data is also applied to an analysis circuit 65 which is adapted to select the most appropriate conversion characteristic based on the distribution of the pixel amplitudes in a block. For example, the analysis circuit 65 detects the maximum and minimum values of the pixel amplitudes in a frame and selects one of the bit number conversion characteristics shown in FIGS. 4B–4E accordingly. The analysis circuit 65 generates and supplies a selection signal to a selector which selects the appropriate ROM data and outputs it as bit number reduced pixel data.

FIG. 3 shows the analysis circuit 65 coupled to the present frame memory 63 because it is necessary to detect a best matching block for the present block stored in the present frame memory 63. The present frame memory 63 of FIG. 3 contains a frame corresponding to reference frame 101 of FIG. 1, while the reference frame memory 60 of FIG. 3 contains a frame generally corresponding to search frame 102 of FIG. 1.

It will be appreciated that other bit number conversion characteristics are also possible.

The number of bits to be eliminated is determined in advance. For example, when pixel image data corresponding to several scenes of different types were analyzed, the effect of bit number reduction on the luminance (Y) signal to noise ratio (SNR) for the Motion Picture Experts Group (MPEG2) algorithm at 6 Mbps with pixel data normally having eight bits was as follows:

| No. bits   | 8 | 6     | 5     | 4     | 3     |
|------------|---|-------|-------|-------|-------|
| Y SNR (dB) | 0 | −0.01 | −0.05 | −0.16 | −0.44 |

When the number of bits of pixel data is reduced to four, the SNR deterioration is conspicuous. When the number of bits is reduced to less than three, errors occur in motion vector detection.

Figure 6:
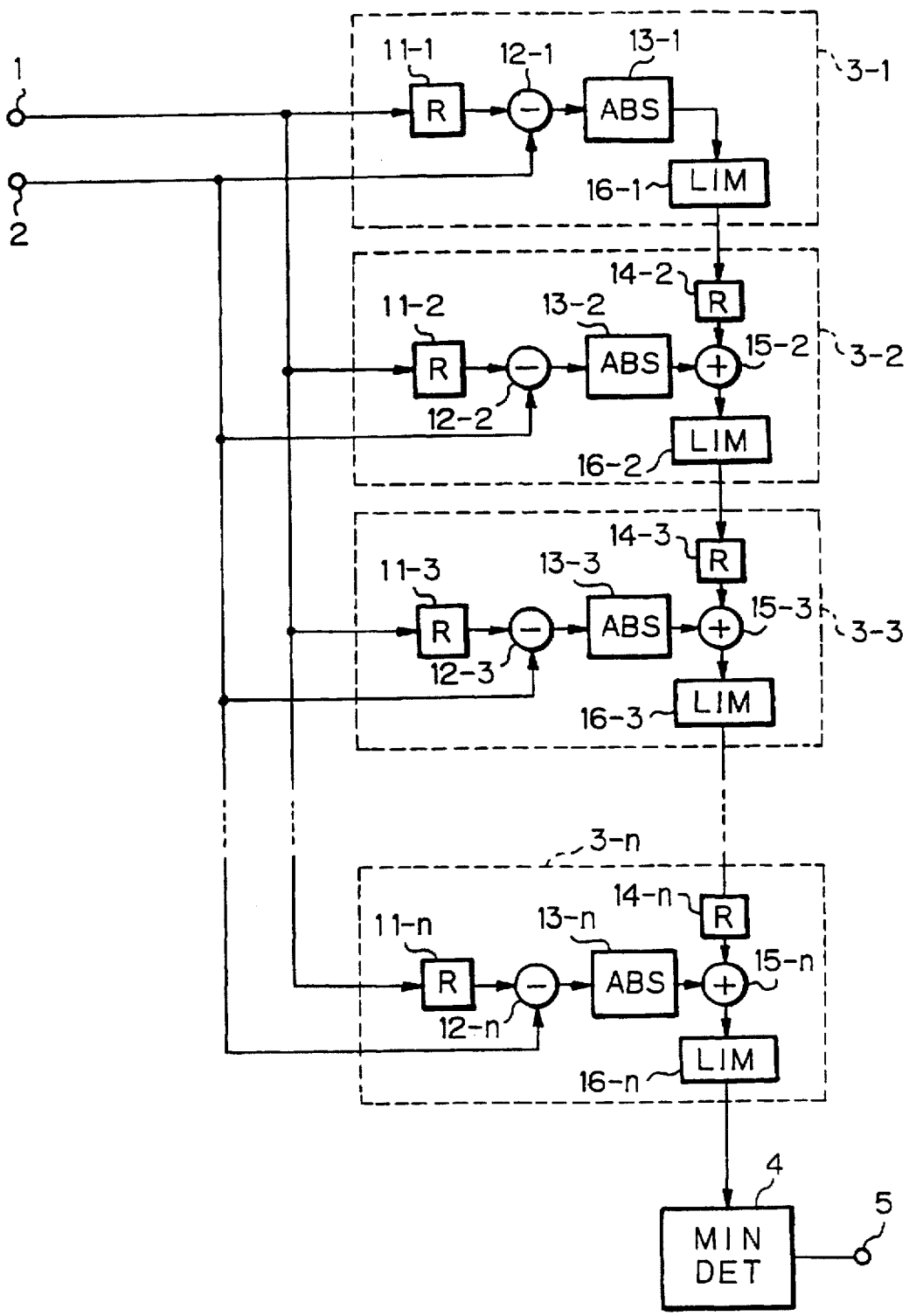
FIG. 6 is a block diagram of a motion vector detecting circuit according to the present invention.

FIG. 6 is a block diagram of a motion vector detecting circuit 62 according to the present invention. The circuit 62 is arranged as a series of pipelined operation units 3-1, 3-2, . . . 3-n, discussed in detail below. In the case of a block of 16 pixels×16 lines, n=16×16=256, that is, there are 256 operation units in the motion vector detecting circuit 62.

Pixels of a reference block are sequentially supplied to input terminal i which supplies the pixels to the operation units 3-1, 3-2, . . . for storage therein. Pixels of a search block are sequentially supplied to input terminal 2 which supplies the pixels to the operation units 3-1, 3-2, . . . . As the search block is moved through the search range, each of the pixels in the search block is compared with the corresponding pixel in the stored reference block. It will be appreciated that all of the pixels of the reference and search blocks are compared in one cycle of the motion vector detecting circuit 62.

Figure 2A:
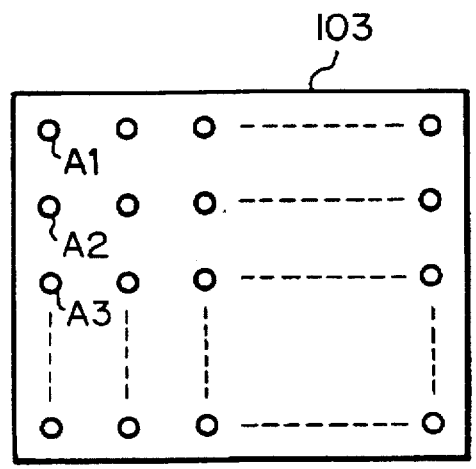
Figure 2B:
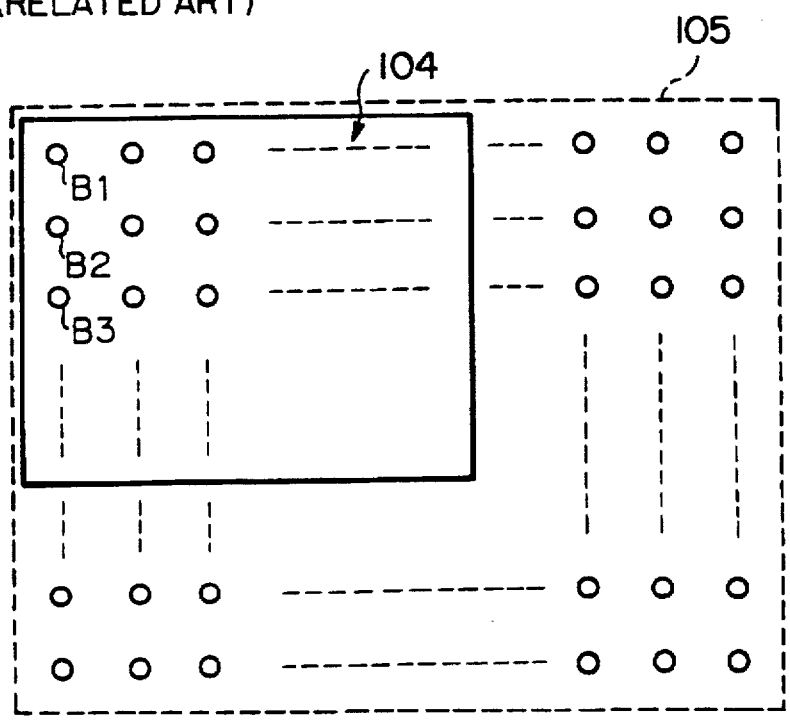

For example, pixel data A1, A2, A3, . . . of a reference block, as shown in FIG. 2A, are sequentially supplied to input terminal 1, and stored in registers 11-1, 11-2, 11-3, . . . , of the operation units 3-1, 3-2, 3-3, . . . , respectively. In a first cycle, pixel data B1, B2, B3, . . . of a search block, as shown in FIG. 2B, are sequentially supplied to the input terminal 2 and supplied to the operation units 3-1, 3-2, 3-3, . . . , respectively, at a first position of the search block. In a second cycle, the pixel data B2, B3, B4, . . . are supplied to the operation units 31, 3-2, 3-3, . . . , respectively, at a second position of the search block. In a third cycle, the pixel data B3, B4, B5, . . . are supplied to the operation units 3-1, 3-2, 3-3, . . . , respectively, at a third position of the search block, and so on.

Each of the operation units 3-1, 3-2, . . . obtains the absolute value of the difference between the pixel of the reference block and the pixel of the search block applied thereto, and adds this absolute value to a partial sum of pixel differences received from its predecessor operation unit in the pipeline to form a further partial sum.

In accordance with the present invention, the number of bits in the partial sum is limited to a predetermined number, so that the circuit scale of the motion vector detecting apparatus 62 can be reduced.

The last operation unit 3-n supplies its further partial sum, which is actually the complete sum of the absolute values of the differences of the pixels in the reference and search blocks, to minimum value detecting circuit 4. The complete sum represents the distortion between the search block and the reference block.

The minimum value detecting circuit 4 functions to store the sums applied thereto from the operation unit 3-n at each position of the search block in the search range, to detect the minimum value among the sums stored therein, to generate a motion vector between the reference block and the position of the search block corresponding to the minimum sum, and to supply the motion vector to an output terminal 5. It will be appreciated that detecting circuit 4 need store only the best sum obtained as the search block is moved through the search range, rather than all sums.

FIG. 7 is a block diagram of an operation unit of the circuit shown in FIG. 6.

A reference block pixel is applied to terminal 21 and supplied therefrom to register 11 which stores the reference block pixel therein while the search block is moved through the search range in the search frame, and supplies the reference pixel to subtracting circuit 12.

Search block pixels are applied to terminal 22 as the search block is moved through the search range. At each cycle of the operation unit, corresponding to one position of the search block, one pixel is supplied to terminal 22, and therefrom to subtracting circuit 12.

The subtracting circuit 12 is operative to subtract the search block pixel from the reference block pixel, and to supply the difference to the absolute value circuit 13, which obtains the absolute value of the difference and supplies the absolute value to adding circuit 15. The difference between the search block pixel and the reference block pixel is also referred to herein as distortion data.

A partial sum of pixel differences from the preceding operation unit is supplied to an input terminal 23, and therefrom to pipeline register 14 which delays the partial sum by one clock interval and supplies the delayed partial sum to adding circuit 15. The number of clock intervals in each operation cycle of the motion vector detecting circuit 62 is approximately equal to the number of pixels in a block.

The adding circuit 15 adds the partial sum from the preceding operation unit and the absolute value of the difference of the pixels of the reference and search blocks to produce a further partial sum, and supplies the further partial sum to limiter 16.

In accordance with the present invention, the limiter 16 is operative to limit the number of bits in the partial sum to a predetermined number, and to supply the bit limited partial sum to an output terminal 24, for application to the succeeding operation unit.

The limiter 16 receives a carry bit from the adder 15. When the carry bit has a value of zero, indicating no carry, then the selection circuit in the limiter functions to pass the further partial sum from adder 15 to terminal 24 without change. When the carry bit has a value of one, indicating a carry, then the selection circuit in the limiter functions to select an output in which all bits are set to one, that is, the limiter limits the partial sum to its maximum value. The carry bit functions as an overflow indication bit. In other words, the limiter selects a smaller of a predetermined maximum value and the further partial sum of difference data.

It will be appreciated that when the partial sum has its maximum value, the search block is substantially unlike the reference block, that is, the distortion between the reference and search blocks is high.

For example, when a carry is indicated, if the predetermined maximum number of bits in the partial sum is twelve, then a value of FFF (Hex) is selected. If the predetermined maximum number of bits in the partial sum is thirteen, then a value of 1FFF (Hex) is selected.

The predetermined maximum number of bits to which the partial sum is limited is determined in advance. For example, when pixel image data corresponding to several scenes were analyzed, the effect of limiting the number of bits in the partial sum on the luminance SNR for the MPEG2 algorithm at 6 Mbps with an unlimited partial sum having sixteen bits was as follows:

| No. bits | 16 | 15 | 14 | 13 | 12 | 11 |
|---|---|---|---|---|---|---|
| Y SNR (dB) | 0 | 0 | 0 | −0.01 | −0.46 | −2.66 |

When the number of bits in the partial sum is limited to thirteen, the amount of SNR deterioration is negligible. However, deterioration is very conspicuous when the number of bits is limited to eleven.

In general, for pixel data having n bits, it is preferred to limit the partial sum to n+5 bits. For example, if the pixel data has already had its bit number reduced from eight bits to six bits, then the partial sum of difference data is limited to eleven bits. However, as shown above, for pixel data of eight bits, it is also satisfactory to limit the number of bits in the partial sum to twelve, that is, n+4 bits.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An apparatus for motion vector detection, comprising:
   first means for receiving and storing reference pixel data having a first number of bits;
   second means for receiving and storing search pixel data;
   means for subtracting pixel data derived from said search pixel data from said reference pixel data to produce difference data;
   means for orthogonally transforming said difference data to produce coefficient data;
   means for quantizing said coefficient data to produce quantized data;
   means for inverse quantizing said quantized data to produce recovered coefficient data;
   means for inverse orthogonally transforming said recovered coefficient data to produce recovered difference data;
   means for modifying said recovered difference data to produce said search pixel data having said first number of bits for storing said search pixel data in said second storing means;
   means for reducing said first number of bits of said search pixel data and of said reference pixel data to a second number of bits which is less than said first number of bits, said second number of bits excluding at least one least significant bit of said search pixel data and of said reference pixel data, respectively; and
   means for detecting a motion vector between the bit number reduced search pixel data and the bit number reduced reference pixel data.

2. The apparatus of claim 1, wherein said means for detecting a motion vector comprises:
   means for subtracting said bit number reduced search pixel data from said bit number reduced reference pixel data to produce difference data;
   means for obtaining an absolute value of said difference data;
   means for receiving partial sum of difference data;
   means for adding said absolute value of said difference data and said partial sum of difference data to produce further sum of difference data; and
   means for limiting said further sum of difference data to a third number of bits which is greater than said second number of bits.

3. An apparatus according to claim 1, wherein said means for reducing comprises memory means containing a look-up table representing a bit number conversion characteristic for pixel data.

4. An apparatus according to claim 3, wherein said bit number conversion characteristic is non-linear.

5. An apparatus according to claim 3, wherein said bit number conversion characteristic maps pixel data in only a first selected range of values to a second selected range of values, and maps pixel data outside said first selected range of values to one of a minimum value and a maximum value.

6. An apparatus according to claim 3, wherein said means for reducing also includes means for selecting said bit number conversion characteristic from a plurality of bit number conversion characteristics as a function of said reference pixel data.

7. The apparatus of claim 6, further comprising means for detecting maximum and minimum values of said reference pixel data.

8. An apparatus for motion vector detection, comprising:
   means for receiving reference pixel data having a first number of bits;
   means for receiving search pixel data having said first number of bits;
   means for subtracting said search pixel data from said reference pixel data to produce difference data;
   means for obtaining an absolute value of said difference data;
   means for receiving partial sum of difference data;
   means for adding said absolute value of said difference data and said partial sum of difference data to produce further sum of difference data; and
   means for limiting said further sum of difference data to a second number of bits which is greater than said first number of bits.

9. An apparatus according to claim 8, wherein said means for receiving search pixel data is operative to receive said search pixel data at a plurality of timepoints, each of the timepoints corresponding to a different position of a search block in a search range, and further comprising motion vector detecting means for selecting the bit limited further sum having a minimum value that corresponds to the position of said search block in said search range which best matches a reference block.

10. An apparatus according to claim 8, wherein said second number of bits is equal to said first number of bits plus four.

11. An apparatus according to claim 8, wherein said second number of bits is equal to said first number of bits plus five.

12. An apparatus according to claim 8, wherein said reference pixel data and said search pixel data represent respective pixel blocks of size (m×n), m and n being integers, said means for subtracting comprises (m×n) subtraction units, said means for obtaining an absolute value comprises (m×n) absolute value units, said means for adding comprises (m×n−1) addition units, and said means for limiting comprises (m×n) limiter units.

13. An apparatus according to claim 12, wherein m=16 and n=16.

14. An apparatus according to claim 8, wherein said means for limiting comprises means for selecting a smaller of a predetermined maximum value and said further sum of difference data.

15. An apparatus according to claim 14, wherein said means for adding is also operative to produce an overflow indicator, and said means for selecting selects between said predetermined maximum value and said further sum as a function of said overflow indicator.

16. An apparatus according to claim 14, wherein said predetermined maximum value comprises said second number of bits and each of the bits of said predetermined maximum value has a value of 1.

17. An apparatus for compressing image data, comprising:
firs means for receiving and storing present pixel data having a first number of bits;
means for subtracting predicted pixel data from said present pixel data to produce difference data;
means for orthogonally transforming said difference data to produce coefficient data;
means for quantizing said coefficient data to produce quantized data;
means for inverse quantizing said quantized data to produce recovered coefficient data;
means for inverse orthogonally transforming said recovered coefficient data to produce recovered difference data;
means for combining said recovered difference data and said predicted pixel data to produce reference pixel data having said first number of bits;
second means for receiving and storing said reference pixel data;
means for reducing said first number of bits of said present pixel data and of said reference pixel data to a second number of bits which is less than said first number of bits, said second number of bits excluding at least one least significant bit of said present pixel data and of said reference pixel data, respectively;
means for detecting a motion vector between the bit number reduced present pixel data and the bit number reduced reference pixel data; and means for motion compensating said reference pixel data using the detected motion vector to produce said predicted pixel data.

18. The apparatus of claim 17, wherein said means for detecting a motion vector comprises
means for subtracting said bit number reduced present pixel data from said bit number reduced reference pixel data to produce distortion data;
means for obtaining an absolute value of said distortion data;
means for receiving partial sum of difference data;
means for adding said absolute value of said distortion data and said partial sum of difference data to produce further sum of difference data; and
means for limiting said further sum of difference data to a third number of bits which is greater than said second number of bits.

19. An apparatus for compressing image data, comprising:
means for receiving present pixel data having a first number of bits;
means for subtracting predicted pixel data from said present pixel data to produce difference data;
means for orthogonally transforming said difference data to produce coefficient data;
means for quantizing said coefficient data to produce quantized data;
means for inverse quantizing said quantized data to produce recovered coefficient data;
means for inverse orthogonally transforming said recovered coefficient data to produce recovered difference data;
means for combining said recovered difference data and said predicted pixel data to produce reference pixel data having said first number of bits;
means for detecting a motion vector between said present pixel data and said reference pixel data, including means for subtracting said present pixel data from said reference pixel data to produce distortion data; means for obtaining an absolute value of said distortion data; means for receiving partial sum of difference data; means for adding said absolute value of said distortion data and said partial sum of difference data to produce further sum of difference data; and means for limiting said further sum of difference data to a second number of bits which is greater than said first number of bits; and
means for motion compensating said reference pixel data using the detected motion vector to produce said predicted pixel data.

20. A method for motion vector detection, comprising the steps of:
receiving and storing reference pixel data having a first number of bits;
receiving and storing search pixel data;
subtracting pixel data derived from said search pixel data from said reference pixel data to produce difference data;
orthogonally transforming said difference data to produce coefficient data;
quantizing said coefficient data to produce quantized data;
inverse quantizing said quantized data to produce recovered coefficient data;
inverse orthogonally transforming said recovered coefficient data to produce recovered difference data;

modifying said recovered difference data to produce search pixel data having said first number of bits and storing said search pixel data;

reducing said first number of bits of said search pixel data and of said reference pixel data to a second number of bits which is less than said first number of bits, said second number of bits excluding at least one least significant bit of said search pixel data and of said reference pixel data, respectively; and detecting a motion vector between the bit number reduced search pixel data and the bit number reduced reference pixel data.

21. A method for motion vector detection, comprising the steps of:

receiving reference pixel data having a first number of bits;

receiving search pixel data having said first number of bits;

subtracting said search pixel data from said reference pixel data to produce difference data;

obtaining an absolute value of said difference data;

receiving partial sum of difference data;

adding said absolute value of said difference data and said partial sum of difference data to produce further sum of difference data; and limiting said further sum of difference data to a second number of bits which is greater than said first number of bits.

22. A method for compressing image data, comprising the steps of:

receiving and storing present pixel data having a first number of bits;

subtracting predicted pixel data from said present pixel data to produce difference data;

orthogonally transforming said difference data to produce coefficient data;

quantizing said coefficient data to produce quantized data;

inverse quantizing said quantized data to produce recovered coefficient data;

inverse orthogonally transforming said recovered coefficient data to produce recovered difference data;

combining said recovered difference data and said predicted pixel data to produce reference pixel data having said first number of bits;

receiving and storing said reference pixel data;

reducing said first number of bits of said present pixel data and of said reference pixel data to a second number of bits which is less than said first number of bits, said second number of bits excluding at least one least significant bit of said present pixel data and of said reference pixel data, respectively;

detecting a motion vector between the bit number reduced present pixel data and the bit number reduced reference pixel data; and motion compensating said reference pixel data using the detected motion vector to produce said predicted pixel data.

23. A method for compressing image data, comprising the steps of:

receiving present pixel data having a first number of bits;

subtracting predicted pixel data from said present pixel data to produce difference data;

orthogonally transforming said difference data to produce coefficient data;

quantizing said coefficient data to produce quantized data;

inverse quantizing said quantized data to produce recovered coefficient data;

inverse orthogonally transforming said recovered coefficient data to produce recovered difference data;

combining said recovered difference data and said predicted pixel data to produce reference pixel data having said first number of bits;

detecting a motion vector between said present pixel data and said reference pixel data by subtracting said present pixel data from said reference pixel data to produce distortion data; obtaining an absolute value of said distortion data; receiving partial sum of difference data; adding said absolute value of said distortion data and said partial sum of difference data to produce further sum of difference data; and limiting said further sum of difference data to a second number of bits which is greater than said first number of bits; and motion compensating said reference pixel data using the detected motion vector to produce said predicted pixel data.

\* \* \* \* \*